March 11, 1941.  K. DZIEWIOR  2,234,334
IMPULSE METHOD OF DIRECTION FINDING
Filed May 27, 1938
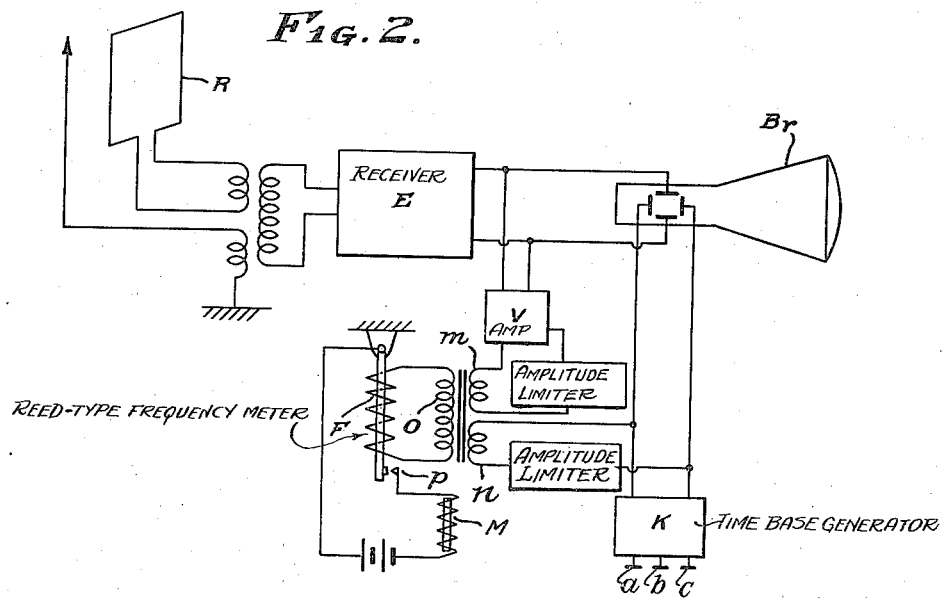
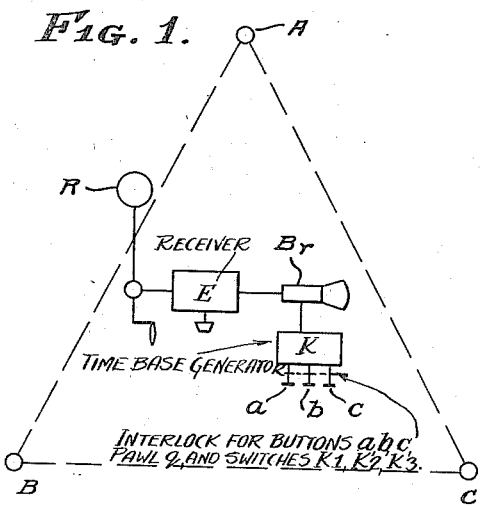
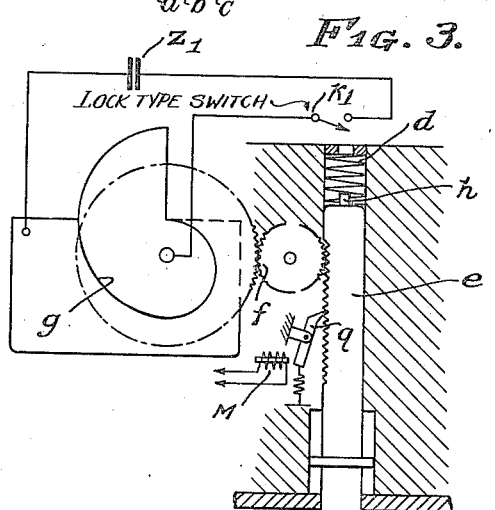
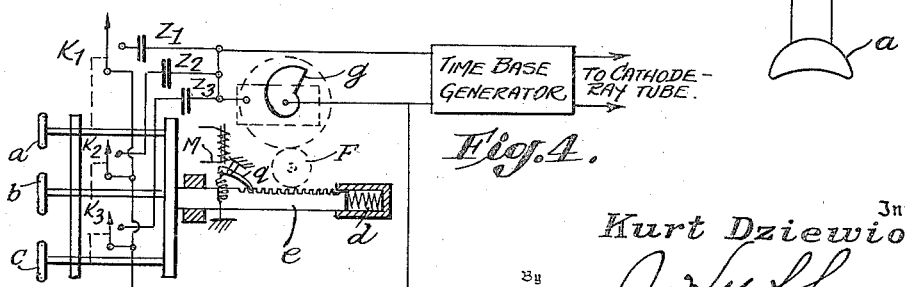
Inventor
Kurt Dziewior
By
Attorney Patented Mar. 11, 1941

2,234,334

UNITED STATES PATENT OFFICE 2,234,334

IMPULSE METHOD OF DIRECTION FINDING

Kurt Dziewior, Berlin, Germany, assignor to Telefunken Gesellschaft für Drahtlose Telegraphie m. b. H., Berlin, Germany, a corporation of Germany Application May 27, 1938, Serial No. 210,521
In Germany June 2, 1937

10 Claims. (Cl. 250—11)

Position finding by the aid of impulse direction-finding may be effected in the following fashion: Over a large area are mounted three transmitters (Fig. 1). All of these transmitters operate on one and the same wave-length, though the impulse sequence differs in each case. For instance, transmitter A works with an impulse frequency of 270 cycles per second; B with an impulse frequency of 280 cycles per second; and C with an impulse frequency of 290 cycles per second. In other words, the various transmitters are identifiable by their characteristic impulse frequency.

If only two impulse transmitters are in existence, bearings may be taken from the craft itself provided that compass means are additionally provided. If it is desired also to dispense with the compass, three transmitters are absolutely required. But by the use of impulse direction finding the entire equipment is rendered unaffected by and free from night effects.

According to prior practice impulse direction-finding was effected in the following manner: On board the craft, say an airplane, is mounted a loop- or frame-type direction-finder comprising an adjustable frame R, a tunable receiver E, a Braun cathode-ray tube Br, and a tunable time-base generator K to insure time-base deflection for the cathode-ray of the Braun tube. In order to take bearings from a transmitter, with tuned receiver, it is first necessary to place the frame or coil in the minimum-signal-strength position. The next step is to regulate the frequency of the impulse generator so that upon the screen of the Braun tube an upright stationary pattern appears. For direction-finding relative to the second and the third transmitter the same procedure is necessary in each instance. The total lapse of time for this measurement is of the order of one minute. However, on the basis of this length of time, an airplane traveling, say, at an hourly rate of speed of 300 kilometers, between the taking of bearings from the first and the third beacon or radio range will cover a distance of 5 kilometers. In fact, it is for this reason that precise position-finding has heretofore been impossible.

According to this invention a receiving equipment adapted to impulse direction-finding, especially designed for position-finding of a rapidly traveling craft is disclosed which is designed to permit taking bearings in rapid succession from two or more transmitters working on the same carrier-wave, the transmitters differing by different impulse frequencies from one another. This scheme has the characteristic and outstanding feature that while taking bearings from one radio range the simultaneously incident impulse frequency of the transmitter next to be used for bearings synchronizes the time-base frequency required for time deflection of the Braun tube provided as an indicator.

This invention will be better understood from the following description when considered in connection with the accompanying drawing in which Figure 1 represents the general arrangement of a receiver and three transmitters; Figure 2 is a schematic diagram of a receiver in accordance with this invention; Figure 3 is a sketch illustrating a mechanical synchronizer; and Figure 4 is a schematic illustration of a modification of the invention.

The further idea underlying the invention shall be described in connection with an exemplified embodiment. Referring to the drawing, if the frame R (Fig. 1) in reference to transmitter A is in the minimum signal strength position, it will pick up oscillations from transmitter B as well as from transmitter C (both of which, as stated, operate on the same wave-length), the said oscillations being of an impulse frequency characteristic for the said two transmitters. Now, the impulse frequency picked up from the transmitter B whence bearings are next to be taken is used for synchronization of the time-base deflection. Preferably by mechanical means, this synchronization occurs so rapidly that synchronism is established before the frame has been turned from the minimum position relative to transmitter A to the minimum position relative to transmitter B. The time base generator K is furnished with three buttons $a$, $b$, $c$. As shown in Fig. 3, by pressing down one such button or knob, mechanical energy is stored by the tensioning of a spring $d$. Connected with knob $a$ is a rack $e$ which is in mechanically rigid relationship through a tooth-wheel gear $f$ with the revoluble system of the element designed to adjust the frequency of the time base generator, say, a tuning condenser $g$. At the same time, by the aid of a pin $h$ provided at one end of the said toothed rack $e$ a contact $K_1$ is closed whereby a capacity $Z_1$ is connected in parallel relation to the tuning element which has here been assumed to be a condenser $g$. The said capacity has a value which will tune the time base generator to the characteristic impulse frequency of the transmitter from which bearings are to be taken.

When the button $a$ is depressed the condenser $g$ is moved, for example, from its minimum to its maximum position, and condenser $Z_1$ is connected in the circuit. Upon the release of the button $a$ the stored energy will cause the condenser to return to its minimum position. By properly selecting the value of the condenser $Z_1$, the condenser $g$ will tune the time base generator through the characteristic impulse frequency of the station A. Buttons $b$ and $c$ will operate other switches and connect other condensers $Z_2$, $Z_3$ in turn across the variable condenser $g$, so that the return of condenser $g$ will tune the time base generator through a different and exclusive range of frequencies in each case. The impulse frequencies of the transmitters should lie approximately in the middle of the respective ranges covered by the time base generator. The mechanism may be arranged so that the condenser $g$ has a maximum capacity in its normal position, if desired.

Synchronization may be effected in the following fashion: The impulse frequencies from the time-base K and the impulse frequencies from the receiver are passed through windings $n$ and $m$, respectively, of a transformer. The secondary winding $o$ of the said transformer is connected with a reed-type frequency meter F, the reeds of which are included in a relay circuit containing relay M. The impulse frequency coming in from the transmitter, or the filtered first harmonic thereof, is fed, optionally by way of an amplifier V, to the winding $m$. By action of the impulse frequencies coming from the receiver, the respective reeds of the frequency meter will be caused to vibrate at a constant low amplitude. If, then, in addition a current of like frequency arrives from the time base generator, this will cause an appreciable boost of the mechanical vibration amplitude. Thus, when the tuning element of the time-base generator is rotated by the action of the stored mechanical energy, it follows that the time-base frequency and one of the incoming impulse frequencies at a certain instant will be alike. Owing to the increased amplitude of the mechanical energy of the corresponding reed the contact $p$ for a brief instant is closed so that the relay M, which may be of the time-lag type, is energized, and thus the further detention of the spring $d$ is prevented by the aid of the pawl $q$. The rack $e$, therefor, will be held at this instant, and the frequency of the time-base generator corresponds exactly to the impulse frequency of the transmitter from which a bearing is now to be taken, or to the first harmonic of this impulse frequency.

The synchronizing means must operate in such a way that the frequency meter F will never be so strongly excited by the incoming impulse frequency or by the time-base frequency alone that the contact $p$ will be closed by either of these two frequencies. In other words, amplitude limiters must be included in both these leads. As soon as the relay M is deenergized, and this will happen when any of the knobs $a$, $b$, $c$ are depressed, the spring at the base of the pawl $q$ will release the pawl. A suitable interlock for the switches and the knobs is shown in Figure 13 of Nichols U. S. Patent No. 480,208.

In lieu of the triple arrangement required for taking directions from three transmitters as shown in Fig. 3, the entire mechanism could be simplified by providing only one energy-storing mechanism, while each of the three buttons $a$, $b$, $c$ will be able to cause actuation thereof as shown in Fig. 4. The three knobs then differ from one another only by the connection of different switches $K_1$, $K_2$, $K_3$ and thus of different parallel capacitors $Z_1$, $Z_2$, and $Z_3$, the last two of these not being shown in the drawing. As already stated, the said switches must be of the detent or lock type in such a way that they will be restored to their position of rest from their active position only by additional force. The same thing holds true of the pawl $q$ which is but briefly energized by the relay M. In other words, also the pawl $q$ is to release the rack $e$ only when it is caused to do so by virtue of an externally acting force. And these auxiliary forces are supplied in each case by the depression of the next following knobs $b$ and $c$, respectively.

By the aid of an arrangement as here illustrated by way of example, impulse direction-finding is effected in the following manner: The receiver E is first tuned to the wave-length of the impulse transmitters. Next the knob $a$ is depressed, and frame R is placed in the minimum signal strength position in relation to transmitter A. At the same time, the frame is adjusted to the requisite compensation of night or other effects vitiating zero position. After the first bearing value has been read, knob $c$ is pushed down, and the coil is set to zero signal strength relative to transmitter station C, and so on. The taking of bearings in this manner requires only a few seconds, so that even a very speedy plane has meanwhile travelled only a short distance. Hence, the bearing data thus obtained may be regarded as accurate.

I claim as my invention:

1. In a direction finding system which includes a plurality of impulse transmitters having the same carrier frequency and different impulse frequencies and a receiver having a cathode ray indicator and a time base generator, the method of operation which includes the steps of receiving pulses from one of said transmitters, applying said impulses and currents from the time base generator to synchronize the frequency of the time base generator to the pulse frequency of the received signals, and applying the thus synchronized time base generator currents to said cathode ray indicator to provide a cathode ray sweep synchronized with said received pulses.

2. In a device of the character described, a directional receiver responsive to impulse modulated signals, a cathode ray indicator having a time base generator, means for varying the frequency of said time base generator through a range which includes the impulse frequency of said signals, and means controlled by the received signals and the time base generator currents for stopping said variation when the frequency of said time base generator bears a predetermined relation to the impulse frequency of said signals.

3. A device of the character described in claim 2, in which said means for varying the frequency of said time base generator comprises a variable condenser, and means adapted to move said variable condenser into its end position by supplied energy, and adapted to return said variable condenser toward its normal position when said energy is released.

4. A device of the character described in claim 2, in which said means for varying the frequency of said time base generator comprises a variable condenser operably connected to a selector button and adapted to rotate when said button is depressed, and means for returning said condenser towards its normal position when said button is released.

5. A device of the character described in claim 2, in which said means for varying the frequency of said time base generator comprises a variable condenser operably connected to a selector button and adapted to rotate when said button is depressed, and a spring operable on said button to return said button and said condenser toward their normal position when said button is released.

6. In a device of the character described, a directional receiver responsive to a plurality of impulse modulated signals of different impulse frequencies, a cathode ray indicator connected to said receiver and having a time base generator, means for varying the frequency of said time base generator through any desired one of a plurality of distinct frequency ranges corresponding to the impulse frequencies of said signals, and means actuated by currents corresponding to the received signals and to the time base generator signals for stopping said variation when the frequency of said time base generator bears a predetermined relation to the impulse frequency of a desired one of said signals.

7. A device of the character described in claim 6, in which said means for varying the frequency of said time base generator through any desired one of a plurality of distinct frequency ranges includes a plurality of operable buttons corresponding, respectively, to said desired ranges, a plurality of switches, each switch corresponding respectively to a button and operated thereby, a plurality of fixed condensers connected to said switches, a variable condenser connected to said switches and to said time base generator to control its frequency, and means connecting said variable condenser and said plurality of buttons so that operation of any one button operates the connected switch and said variable condenser.

8. A device of the character described in claim 2 in which said means for stopping said variation includes a vibrating reed, means for energizing said reed by currents derived from said impulse modulated signals, means for energizing said reed by currents derived from said time base generator, and means responsive to a predetermined amplitude of vibration of said reed, said predetermined amplitude being greater than that due to either of said energizing currents separately.

9. A device of the character described in claim 2 in which said means for stopping said variation includes a vibrating reed, means for energizing said reed by currents derived from said impulse modulated signals, means for energizing said reed by currents derived from said time base generator, said reed being vibrated with a maximum intensity when the frequencies of said energizing currents are equal, and a relay responsive to said maximum intensity of vibration.

10. In a device of the character described, a directional receiver responsive to impulse modulated signals, a cathode ray indicator having a time base generator, a variable condenser for varying the frequency of said time base generator, means for storing energy when said condenser is moved into its end position and for returning said condenser toward its normal position when said energy is released, a relay, a vibrating reed energized by currents derived from said impulse modulated signals and responsive to currents from said time base generator, said relay being operable by said reed when said currents are of like frequency, and a pawl operated by said relay engageable with a ratchet adapted to stop the return of said condenser to synchronize said currents.

KURT DZIEWIOR.